(12) United States Patent
Tanaka (10) Patent No.: US 6,498,822 B1
(45) Date of Patent: Dec. 24, 2002

(54) FREQUENCY AND TIMING SYNCHRONIZATION CIRCUIT MAKING USE OF A CHIRP SIGNAL

(75) Inventor: Hiroshi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/295,395

(22) Filed: Apr. 21, 1999

(30) Foreign Application Priority Data

Apr. 24, 1998  (JP) .......................................... 10-129699

(51) Int. Cl.$^7$ ................................................ H04L 7/00
(52) U.S. Cl. ...................................... 375/354; 375/139
(58) Field of Search ................................ 375/139, 349, 375/354, 340, 343; 327/161, 165

(56) References Cited

U.S. PATENT DOCUMENTS 5,305,347 A  *  4/1994  Roschmann et al. ......... 375/150

FOREIGN PATENT DOCUMENTS

| JP | 9-8765 | 1/1997 |
| JP | 9-200081 | 7/1997 |
| WO | WO 96/19056 | 6/1996 |

OTHER PUBLICATIONS

Kohno R Et Al: "Array Antenna Beamforming Based On Estimation Of Arrival Angles Using DFt On Spatial domain" IEEE International Symposium on Personal, Indoor and Mobile Communications, (PIMRC' 91), London (UK), Sep. 1991, pp. 38–43, XP010212327.

Oppenheim A V Et Al: "Signal and systems", 1983, Englewood Cliffs, NJ, USA, Prentice–Hall, USA XP002198026 ISNB: 0–13–809731–3.

* cited by examiner

Primary Examiner—Stephen Chin
Assistant Examiner—Kevin Kim
(74) Attorney, Agent, or Firm—Sughrue Mion, PLLC (57) ABSTRACT

To surely detect a frequency shift and a timing difference of a received signal making use of a chirp signal even when the C/N ratio of the received signal is low by resolving the problem of resolution of FFT processing, a frequency and timing synchronization circuit comprises: a chirp signal generator (6) for generating a reference chirp signal and a conjugate complex signal of the reference chirp signal; a first demodulator (7) for obtaining a first in-phase complex signal and a first quadrature-phase complex signal by demodulating the received signal with the reference chirp signal and the conjugate complex signal a frequency offset circuit (5) for obtaining an offset signal by shifting a frequency of the received signal; a second demodulator (8) for obtaining a second in-phase complex signal and a second quadrature-phase complex signal by demodulating the offset signal with the reference chirp signal and the conjugate complex signal; and a detector unit (9) for detecting the frequency shift and a difference of the synchronization timing according to a first peak frequency giving a maximum power spectrum among frequency components of the first and the second in-phase complex signal, and a second peak frequency giving a maximum power spectrum among frequency components of the first and the second quadrature-phase complex signal.

6 Claims, 3 Drawing Sheets

FREQUENCY AND TIMING SYNCHRONIZATION CIRCUIT MAKING USE OF A CHIRP SIGNAL

BACKGROUND OF THE INVENTION

The present invention relates to a frequency and timing synchronization circuit to be applied to a TDMA (Time Division Multiple Access) receiver making use of a chirp signal.

In a radio communication system such as a mobile communication system, where high-speed digital signals are transmitted through multi-paths changing their status every moment, it is very important for a receiver how to quickly and exactly establish initial synchronization of detection frequency and symbol timings with a receiving radio signal even in a low C/N (Carrier to Noise) ratio.

In a Japanese patent application entitled "Frequency Correction Apparatus" and laid open as a Provisional Publication No. H09-008765 (hereinafter called the first prior art), there is disclosed a method of correcting a reference frequency for detecting an OFDM (Orthogonal Frequency Division Multiplex) signal.

The frequency correction apparatus of the first prior art comprises a frequency converter having a controllable local oscillator for converting the OFDM radio-frequency signal into an intermediate-frequency signal, a quadrature demodulator for splitting the intermediate-frequency signal into an in-phase and a quadrature-phase signal, a complex FFT (Fast Fourier Transform) circuit for performing complex Fourier transformation of the in-phase and the quadrature-phase signal, and a power measurement circuit for obtaining a frequency distribution of power spectrums of the OFDM signal in a frequency domain from the output of the complex FFT circuit.

By detecting a center position of the frequency distribution when multi-carriers are arranged symmetrically to a center frequency of the OFDM signal in the frequency domain, or by detecting a position of a reference carrier when it is inserted in the OFDM signal with an intensity different to other carriers, the actual center frequency of the OFDM signal is determined and the local oscillator is feedback-controlled for acquiring frequency synchronization with the receiving signal, in the first prior art.

In another Japanese patent application entitled "A Frequency Error Detection Circuit by Detecting a Correlation Peak" and laid open as a Provisional Publication No. H09-200081 (hereinafter called the second prior art), a method of detecting a frequency error for controlling an AFC (Automatic Frequency Control) circuit is disclosed to be applied to a DSSS (Direct Sequence Spread Spectrum) receiver.

The frequency error detection circuit according to the second prior art comprises;

a first complex code generator for generating a first complex code which is obtained by giving a certain frequency offset to a pseudo random scramble code toward a positive side, a second complex code generator for generating a second complex code obtained by giving the same frequency offset to the pseudo random scramble code toward a negative side, a first and a second complex matched filter each calculating complex correlation of a base-band complex signal obtained through a quadrature demodulator with the first complex code and. the second complex code;

a peak timing detector for outputting a peak timing for every symbol where either or both of outputs of the first and the second complex matched filter show a maximum power value, a first and a second peak average detector for outputting a first and a second peak average by calculating averages, for several symbols, of peak values which are extracted from outputs of the first and the second complex matched filter at each peak timing detected by the peak timing detector, a first and a second power calculator for calculating power values of the first and the second peak average, respectively, a power difference calculator for obtaining a normalized power difference by dividing a difference between outputs of the first and the second power calculator by a sum thereof, and a frequency error converter for outputting a frequency error corresponding to the normalized power difference referring to a table memory.

The complex matched filter functions as a band-pass filter. Therefore, the power value of the first peak average becomes larger than that of the second peak average when a positive frequency error remains in the base-band complex signal, and vice versa, which is detected by the frequency error converter and converted into the frequency error to be fed back to the quadrature detector, in the frequency error detection circuit of the second prior art.

There is also a method of establishing frequency and timing synchronization making use of a chirp signal, which is to be applied to a mobile terminal, for example, receiving a SCH (Synchronization Channel) signal according to the TDMA communication system.

Figure 3:
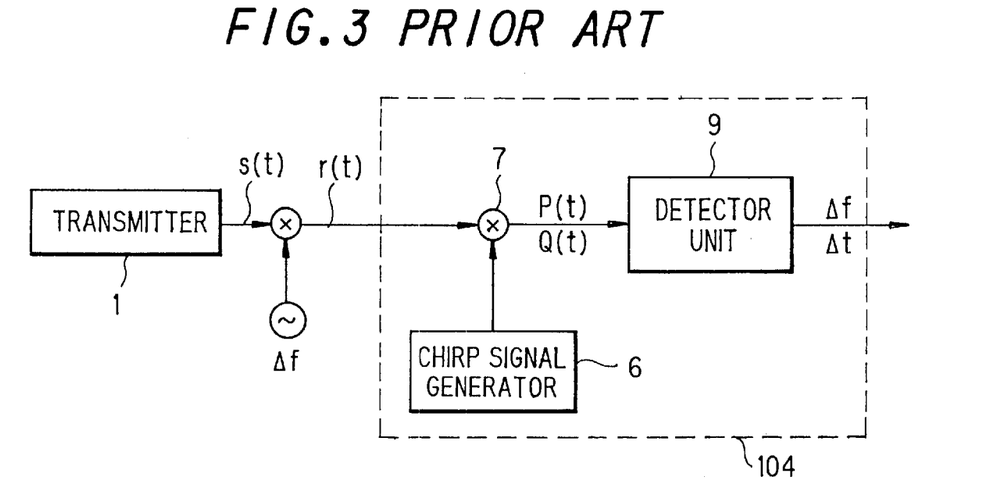
FIG. 3 is a block diagram illustrating a conventional frequency and timing synchronization circuit 104 making use of a chirp signal.

FIG. 3 is a block diagram illustrating a conventional frequency and timing synchronization circuit 104 making use of the chirp signal.

The frequency and timing synchronization circuit 104 of FIG. 3 comprises a chirp signal generator 6, a demodulator 7 and a detector unit 9.

From a transmitter 1, a radio signal, wherein certain symbols are scrambled with a chirp signal s(t) represented by following equation (1), is transmitted.

$$s(t) = \sqrt{2} \cos\left(\frac{\pi t^2}{\mu T^2}\right) \quad (1)$$

$$= \frac{1}{\sqrt{2}} \left\{ \exp\left(\frac{j\pi t^2}{\mu T^2}\right) + \exp\left(\frac{-j\pi t^2}{\mu T^2}\right) \right\}$$

Here, t, $\mu$ and T is a time counted from beginning of each symbol, a constant called a chirp rate, and a symbol cycle, respectively.

The radio signal arrives through transmission paths to a receiver added with a frequency shift $\Delta f$ due to fading, for example, and therefore, the chirp signal r(t) in the received signal is expressed as follows.

$$r(t) = s(t) \cdot \exp(j2\pi\Delta f t) \quad (2)$$

$$= \frac{1}{\sqrt{2}} \left\{ \exp\left(j2\pi\Delta f t + \frac{j\pi t^2}{\mu T^2}\right) + \exp\left(j2\pi\Delta f t - \frac{j\pi t^2}{\mu T^2}\right) \right\}$$

The chirp signal generator 6 generates a reference chirp signal having the same chirp rate $\mu$ with the transmission signal and expressed as $$\exp\left(\frac{j\pi(t+\Delta t)^2}{\mu T^2}\right),$$

and its conjugate complex signal expressed as $$\exp\left(\frac{-j\pi(t+\Delta t)^2}{\mu T^2}\right),$$

$\Delta t$ being a difference of symbol timings. The reference chirp signal and the conjugate complex signal are multiplied onto the received signal by the demodulator 7 for obtaining following two complex signals P(t) and Q(t) (hereinafter called the in-phase complex signal and the quadrature-phase complex signal, respectively) to analyzed by the detector unit 9;

$$P(t)=r(t)\cdot\exp\left(\frac{j\pi(t+\Delta t)^2}{\mu T^2}\right), \quad (3)$$

$$Q(t)=r(t)\cdot\exp\left(\frac{-j\pi(t+\Delta t)^2}{\mu T^2}\right). \quad (4)$$

Figure 4:
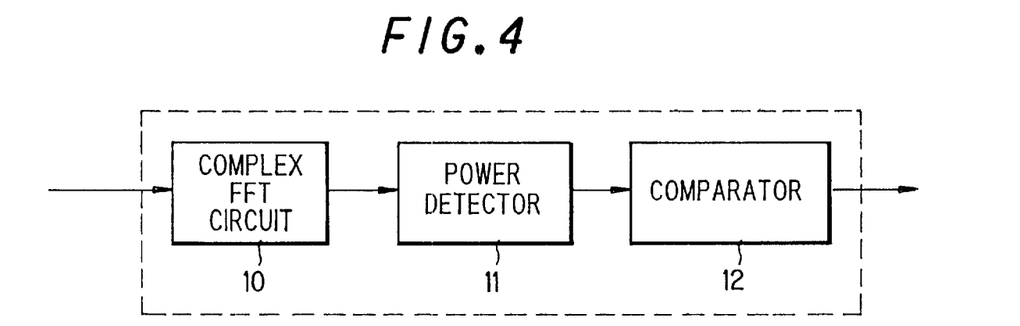
FIG. 4 is a block diagram illustrating a configuration of the detector unit 9 of FIG. 3.

FIG. 4 is a block diagram illustrating a configuration of the detector unit 9 of FIG. 3, comprising a complex FFT circuit 10, a power detector 11 and a comparator 12.

Each of the in-phase and the quadrature-phase complex signal P(t) and Q(t) is transformed into a frequency domain signal through the complex FFT circuit 10, whereof a power value of each frequency component is calculated by the power detector 11 and a frequency component giving a maximum power spectrum is detected by the comparator 12.

As to in-phase complex signal P(t) of equation (3), it is expressed as P(t)=A+B, where;

$$A=\{\text{first term of equation (2)}\}\cdot\exp\left(\frac{j\pi(t+\Delta t)^2}{\mu T^2}\right), \quad (5)$$

and $$B=\{\text{second term of equation (2)}\}\cdot\exp\left(\frac{j\pi(t+\Delta t)^2}{\mu T^2}\right), \quad (6)$$

The term A of equation (5) is calculated as;

$$A=\frac{1}{\sqrt{2}}\exp\left(j2\pi\Delta ft+\frac{j\pi t^2}{\mu T^2}\right)\cdot\exp\left(\frac{j\pi(t+\Delta t)^2}{\mu T^2}\right) \quad (7)$$

$$=\frac{1}{\sqrt{2}}\exp\left(\frac{j2\pi t^2+j2\pi t\Delta t+j\pi\Delta t^2}{\mu T^2}+j2\pi\Delta ft\right)$$

which is a product of $\exp(2j\pi t^2)$ whereof frequency varies according to time passage, and therefore, the term A makes no contribution to the maximum power spectrum after FFT.

The term B of equation (5) is calculated as;

$$B=\frac{1}{\sqrt{2}}\exp\left(j2\pi\Delta ft-\frac{j\pi t^2}{\mu T^2}\right)\cdot\exp\left(\frac{j\pi(t+\Delta t)^2}{\mu T^2}\right) \quad (8)$$

$$=\frac{1}{\sqrt{2}}\exp\left(\frac{j2\pi t\Delta t+j\pi\Delta t^2}{\mu T^2}+j2\pi\Delta ft\right)$$

whereof $$\exp\left(\frac{j\pi\Delta t^2}{\mu T^2}\right)$$

is a constant term to be cancelled in the power spectrum after FFT.

Therefore, a frequency dependent component P, which defines the maximum power spectrum after FFT, of the in-phase complex signal P(t) can be expressed as follows;

$$P=\frac{1}{\sqrt{2}}\exp\left(j2\pi\left(\Delta f+\frac{\Delta t}{\mu T^2}\right)t\right) \quad (9)$$

In the same way, a frequency dependent component Q, which defines the maximum power spectrum after FFT, of the quadrature-phase complex signal Q(t) can be expressed as follows;

$$Q=\frac{1}{\sqrt{2}}\exp\left(j2\pi\left(\Delta f-\frac{\Delta t}{\mu T^2}\right)t\right) \quad (10)$$

Figure 5A:
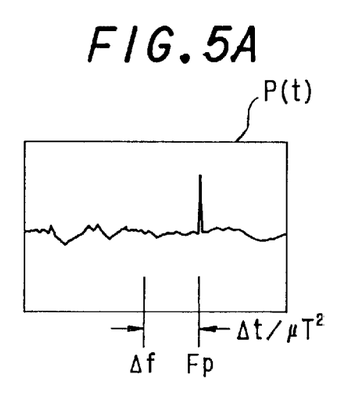
FIG. 5A is a spectrum chart illustrating power spectrum distribution of the in-phase complex signal P(t) obtained from the demodulator 7 of FIG. 3.
Figure 5B:
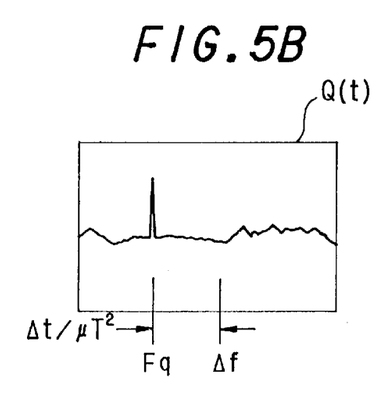
FIG. 5B is a spectrum chart illustrating power spectrum distribution of the quadrature-phase complex signal Q(t) obtained from the demodulator 7 of FIG. 3.

Therefore, the frequency domain signal of the in-phase complex signal P(t) after processed by the complex FFT circuit 10 has a power spectrum peak at a frequency Fp=$\Delta f$ $$Fp=\Delta f+\frac{\Delta t}{\mu T^2}$$

as shown in FIG. 5A, while that of the complex signal Q(t) has a power spectrum peak at a frequency Fq=$\Delta f$ $$Fp=\Delta f-\frac{\Delta t}{\mu T^2}$$

as shown in FIG. 5B, which are detected by the comparator 12.

From these frequencies Fp and Fq, the frequency shift $\Delta f$ and the difference of symbol timing $\Delta t$ are calculated as follows;

$$\Delta f=(Fp+Fq)/2, \quad (11)$$

$$\Delta t=(Fp-Fq)\cdot\mu T^2/2, \quad (12)$$

According to the frequency shift $\Delta f$ and the difference $\Delta t$ of the symbol timings thus obtained, the frequency and timing synchronization is performed in the conventional frequency and timing synchronization circuit 104 of FIG. 3 making use of the chirp signal.

However, there is a problem of frequency resolution of the complex FFT circuit 10 in the conventional frequency and timing synchronization circuit 104 of FIG. 3, when the C/N ratio of the received signal is low.

Figure 6:
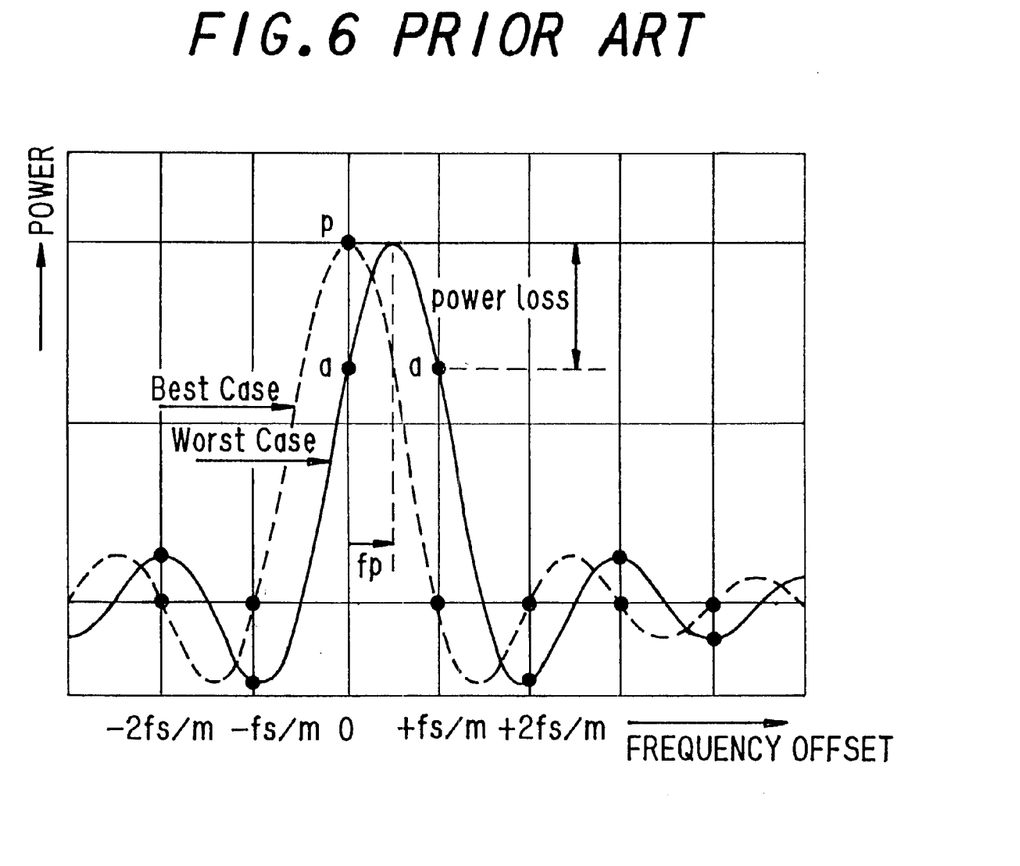
FIG. 6 is a spectrum chart for illustrating a problem of resolution of FFT processing in the conventional frequency and timing synchronization circuit 104 of FIG. 3.

FIG. 6 is a spectrum chart for illustrating the above problem, whereof Y-axis represents frequency offset to a reference frequency and X-axis represents a power value of a signal according to the frequency offset. The resolution of the FFT processing is determined by the sampling frequency fs and the number m of samples, and a vector value is calculated for each frequency component ranged with a frequency difference fs/m, as represented by black dots in FIG. 6.

Therefore, when a signal has a peak value p at the same frequency with the reference frequency or at a frequency just shifted by n (n being an integer) times of fs/m from the reference frequency as illustrated in FIG. 6 with a dashed line denoted as Best Case, the peak value p is output as it is, at the frequency component. However, when the signal has the peak value p at a frequency in a middle of two consecutive resolution steps of the FFT as illustrated with a solid line denoted as Worst Case, the peak value p is to be represented by two off-peak values a of two frequency components nearest to the frequency offset fp giving the peak value p, that is, frequency components having frequency offsets 0 and +fs/m, in the example of FIG. 6.

Therefore, when the signal has a sufficient C/N ratio, the actual offset fp of the peak frequency can be estimated to be fp=+fs/2m, in the example, from frequency offsets 0 and +fs/m of the two off-peak values α. However, when the C/N ratio is low, the off-peak values α may become equivalent to the noise level and become impossible to be detected by the comparator 12.

This is the problem.

SUMMARY OF THE INVENTION

Therefore, a primary object of the present invention is to deal with the above problem and provide a frequency and timing synchronization circuit which can surely detect the frequency shift and the timing difference of a received signal making use of the chirp signal, even when the C/N ratio of the received signal is low.

In order to achieve the object, a frequency and timing synchronization circuit making use of a chirp signal according to the invention, for detecting a frequency shift and a synchronization timing of a received signal modulated with a transmission chirp signal, comprises:

a chirp signal generator for generating a reference chirp signal having the same chirp rate with the transmission chirp signal and a conjugate complex signal of the reference chirp signal;

a first demodulator for obtaining a first in-phase complex signal and a first quadrature-phase complex signal by demodulating the received signal with the reference chirp signal and the conjugate complex signal, respectively;

a frequency offset circuit for obtaining an offset signal by shifting a frequency of the received signal by an offset frequency;

a second demodulator for obtaining a second in-phase complex signal and a second quadrature-phase complex signal by demodulating the offset signal with the reference chirp signal and the conjugate complex signal, respectively; and a detector unit for detecting the frequency shift and the synchronization timing according to a first and a second peak frequency, the first peak frequency giving a maximum power spectrum among frequency components of the first and the second in-phase complex signal, and the second peak frequency giving a maximum power spectrum among frequency components of the first and the second quadrature-phase complex signal.

a detector unit for detecting the frequency shift and a difference of the synchronization timing according to a first peak frequency giving a maximum power spectrum among frequency components of the first and the second in-phase complex signal after processed through FFT, and a second peak frequency giving a maximum power spectrum among frequency components of the first and the second quadrature-phase complex signal after processed through FFT.

The offset frequency is determined in consideration of resolution of the complex FFT circuit defined by a sampling frequency and a number of samples applied in the complex FFT circuit.

Therefore, the effective resolution step of the FFT can be made fine, and the frequency shift and the timing difference of a received signal can be detected surely and exactly making use of the chirp signal, even when the C/N ratio of the received signal is low.

In place of the frequency offset circuit and the second demodulator, there may be comprised:

a plurality of frequency offset circuits each obtaining respective one of offset signals by shifting a frequency of the received signal by a distinct offset frequency; and second demodulators each obtaining respective one of offset in-phase complex signals and respective one of offset quadrature-phase complex signals by demodulating respective one of the offset signals with the reference chirp signal and the conjugate complex signal, respectively.

In this case, the first peak frequency is detected from a frequency component giving a maximum power spectrum among frequency components of the first in-phase complex signal and the offset in-phase complex signals after processed through FFT, and a second peak frequency is detected from a frequency component giving a maximum power spectrum among frequency components of the first quadrature-phase complex signal and the offset quadrature-phase complex signals after processed through FFT.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
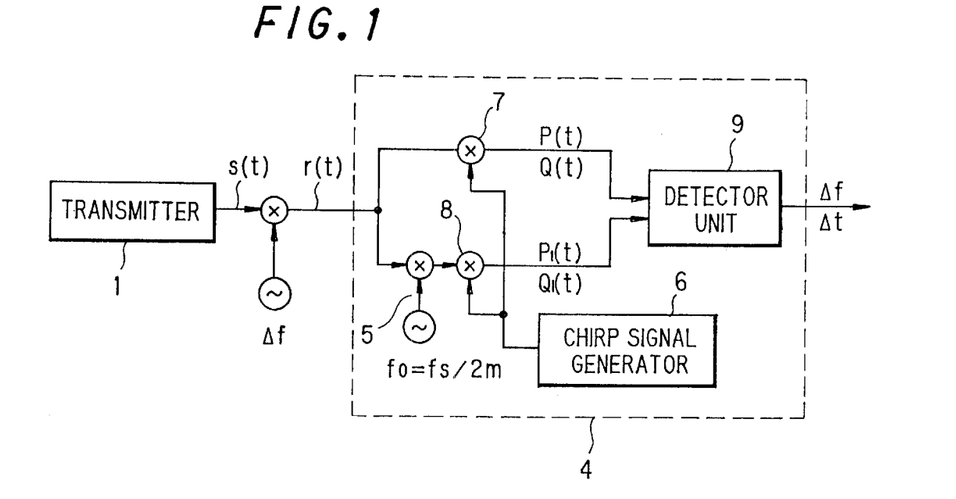
FIG. 1 is a block diagram illustrating a frequency and timing synchronization circuit 4 according to an embodiment of the invention.

FIG. 1 is a block diagram illustrating a frequency and timing synchronization circuit 4 according to an embodiment of the invention for detecting a frequency shift and a synchronization timing of a received signal modulated with a transmission chirp signal.

The frequency and timing synchronization circuit 4 of FIG. 1 comprises, a chirp signal generator 6 for generating a reference chirp signal having the same chirp rate with the transmission chirp signal and a conjugate complex signal of the reference chirp signal;

a first demodulator 7 for obtaining a first in-phase complex signal P(t) and a first quadrature-phase complex signal Q(t) by demodulating the received signal with the reference chirp signal and the conjugate complex signal, respectively;

a frequency offset circuit 5 for obtaining an offset signal by shifting a frequency of the received signal by an offset frequency of f o;

a second demodulator 8 for obtaining a second in-phase complex signal $P_1(t)$ and a second quadrature-phase complex signal $Q_1(t)$ by demodulating the offset signal with the reference chirp signal and the conjugate complex signal, respectively; and a detector unit 9 for detecting the frequency shift Δf and a difference Δt of the synchronization timing according to a first peak frequency Fp giving a maximum power spectrum among frequency components of the first and the second in-phase complex signal P(t) and $P_1(t)$ after processed through FFT, and a second peak frequency Fq giving a maximum power spectrum among frequency components of the first and the second quadrature-phase complex signal Q(t) and $Q_1(t)$ after processed through FFT.

Now operation of the frequency and timing synchronization circuit 4 of FIG. 1 is described.

From a transmitter 1, a radio signal, wherein certain symbols are scrambled with a chirp signal s(t) represented by equation (1) is transmitted and received by the frequency and timing synchronization circuit 4 after added with a frequency shift Δf due to fading, for example, and therefore, the chirp signal r(t) in the received signal is represented by equation (2), as previously described in connection with the conventional frequency and timing synchronization circuit 104 of FIG. 3.

The first demodulator 7 demodulates the received signal with the reference chirp signal and its conjugate complex signal generated by the chirp signal generator 6, and outputs the first in-phase complex signal P(t) represented by equation (3) and the first quadrature-phase complex signal Q(t) represented by equation (4), each having frequency dependent component P and Q represented by each of equations (9) and (10), in the same way with the demodulator 7 of FIG. 3.

In the frequency and timing synchronization circuit 4 of FIG. 1, the received signal is also supplied to the frequency offset circuit 5 for obtaining the offset signal by adding a frequency offset fo to the received signal.

The second demodulator 8 demodulates the offset signal in the same way with the first demodulator 7. Hence, the second in-phase complex signal $P_1(t)$ and the second quadrature-phase complex signal $Q_1(t)$ having respective frequency dependent components $P_1$ and $Q_1$, represented by following equations, are outputted from the second demodulator 8;

$$P_1 = \frac{1}{\sqrt{2}} \exp\left(j2\pi\left(\Delta f + \frac{\Delta t}{\mu T^2}\right)t\right) \quad (13)$$

$$Q_1 = \frac{1}{\sqrt{2}} \exp\left(j2\pi\left(\Delta f + fo - \frac{\Delta t}{\mu T^2}\right)t\right) \quad (14)$$

As can be seen from the above equations (13) and (14), the second in-phase complex signal $P_1(t)$ and the second quadrature-phase complex signal $Q_1(t)$ has a power spectrum peak at frequencies
and $$Fp' = \Delta f + fo + \frac{\Delta t}{\mu T^2} = Fp + Fo,$$

$$Fq' = \Delta f + fo - \frac{\Delta t}{\mu T^2} = Fq + Fo.$$

The detector unit 9 of FIG. 1 has a similar configuration to the detector unit 9 of FIG. 4. However, in the detector unit 9, the complex FFT circuit 10 transforms the first and the second in-phase complex signal P(t) and $P_1(t)$ and the first and the second quadrature-phase complex signal Q(t) and $Q_1(t)$ into discrete frequency domain signals, the power detector 11 calculates a power spectrum of each frequency component of each of the discrete frequency domain signals, and the comparator 12 detects the first peak frequency Fp which gives a maximum value among power spectrums calculated by the power detector 11 from the discrete frequency domain signals corresponding to the first and the second in-phase complex signal P(t) and $P_1(t)$, and the second peak frequency Fq which gives a maximum value among power spectrums calculated by the power detector 11 from the discrete frequency domain signals corresponding to the first and the second quadrature-phase complex signal Q(t) and $Q_1(t)$.

Therefore, by setting the frequency offset fo to be ½, for example, of the resolution step of FFT, namely, fs/2m, fs and m being a sampling frequency and a number of samples to be applied in the FFT, respectively, the effective resolution step of the FFT can be made fine into ½.

Therefore, even when the peak power spectrum cannot be detected by the comparator 12 in a discrete frequency domain signal of either of the first and the second in-phase complex signal P(t) and $P_1(t)$, in such a case as denoted as Worst Case in FIG. 6, a near-peak value can be detected in the discrete frequency domain signal of the other of the first and the second in-phase complex signal P(t) and $P_1(t)$.

When a maximum power spectrum is detected at a frequency Fp' of the discrete frequency domain signal of the second in-phase complex signal $P_1(t)$, the comparator 12 outputs the first peak frequency Fp as Fp=Fp'−fo.

In the same way, the second peak frequency Fq is detected from a discrete frequency domain signal of either of the first and the second quadrature-phase signal Q(t) and $Q_1(t)$.

From the first and the second peak frequency Fp and Fq thus 20 detected, the frequency shift Δf and the difference Δt of the synchronization timing are obtained as Δf=(Fp+Fq)/2 and Δt=(Fp−Fq)·$\mu T^2$/2, in the frequency and timing synchronization circuit of FIG. 1.

As heretofore described, the effective resolution step of the FFT can be made fine into ½ according to the embodiment of FIG. 1, and therefore, the frequency shift and the timing difference of a received signal can be detected surely and exactly making use of the chirp signal, even when the C/N ratio of the received signal is low.

In the embodiment of FIG. 1, one set of a frequency shift circuit for adding a frequency offset of fs/2m and a second demodulator 8 is provided. However, by providing more number sets of the frequency shift circuit and the second demodulator, the effective resolution step of the FFT call be made optionally fine.

Figure 2:
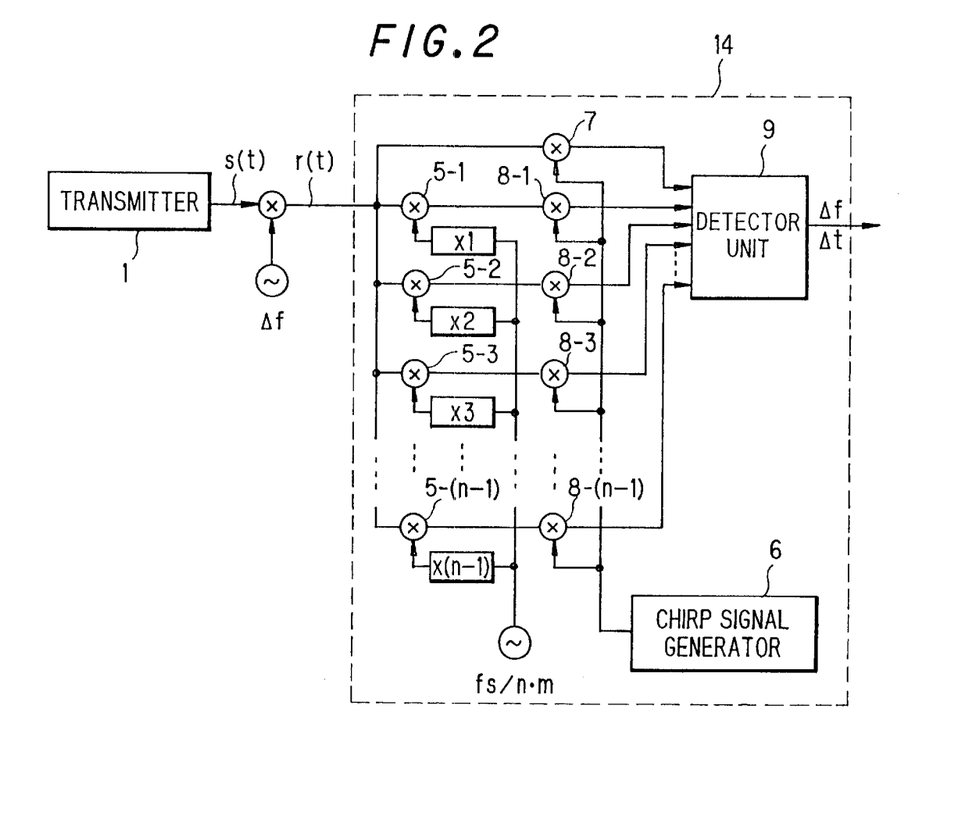
FIG. 2 is a block diagram illustrating a frequency and timing synchronization circuit 14 according to another embodiment of the invention.

FIG. 2 is a block diagram illustrating a frequency and timing synchronization circuit 14 according to another embodiment of the invention, wherein a plurality of frequency offset circuits 5-1 to 5-(n−1) and the same number of second demodulators 8-1 to 8-(n−1) are provided, n being an integer more than one. Each i-th of the frequency offset circuits 5-1 to 5-(n−1) adds a frequency offset of i times fs/(n·in), for example, i being a positive integer smaller than n, and each i-th. of the second demodulators 8-1 to 8-(n−1) generates an offset in-phase complex signal and an offset quadrature-phase complex signal by demodulating the output of respective i-th of the frequency offset circuits 5-1 to 5-(n−1). The detector unit 9 detects the first peak frequency Fp among frequency components of the first in-phase complex signal and offset in-phase complex signals, and the second peak frequency Fq among frequency components of the first quadrature-phase complex signal and the offset quadrature-phase complex signals, in a similar way to the detector unit 9 of FIG. 1. Thus, the effective resolution step of the FFT can be made fine into 1/n.

What is claimed is:

1. A frequency and timing synchronization circuit making use of a chirp signal for detecting a frequency shift and a synchronization timing of a received signal modulated with a transmission chirp signal; the frequency and timing synchronization circuit comprising:

a chirp signal generator for generating a reference chirp signal having the same chirp rate with the transmission chirp signal and a conjugate complex signal of the reference chirp signal;

a first demodulator for obtaining a first in-phase complex signal and a first quadrature-phase complex signal by demodulating the received signal with the reference chirp signal and the conjugate complex signal, respectively;

a frequency offset circuit for obtaining an offset signal by shifting a frequency of the received signal by an offset frequency;

a second demodulator for obtaining a second in-phase complex signal and a second quadrature-phase complex signal by demodulating the offset signal with the reference chirp signal and the conjugate complex signal, respectively; and a detector unit for detecting the frequency shift and the synchronization timing according to a first and a second peak frequency, the first peak frequency giving a maximum power spectrum among frequency components of the first and the second in-phase complex signal, and the second peak frequency giving a maximum power spectrum among frequency components of the first and the second quadrature-phase complex signal.

2. A frequency and timing synchronization circuit as recited in claim 1; the detector unit comprising:

a complex FFT (Fast Fourier Transform) circuit for transforming the first and the second in-phase complex signal and the first and the second quadrature-phase complex signal into discrete frequency domain signals;

a power detector for calculating a power spectrum of each frequency component of each of the discrete frequency domain signals; and a comparator for detecting the first peak frequency which gives a maximum value among power spectrums calculated by the power detector from the discrete frequency domain signals corresponding to the first and the second in-phase complex signal, and the second peak frequency which gives a maximum value among power spectrums calculated by the power detector from the discrete frequency domain signals corresponding to the first and the second quadrature-phase complex signal.

3. A frequency and timing synchronization circuit as recited in claim 2; wherein the offset frequency is determined based on the resolution of the complex FFT circuit defined by a sampling frequency and a number of samples applied in the complex FFT circuit.

4. A frequency and timing synchronization circuit making use of a chirp signal for detecting a frequency shift and a synchronization timing of a received signal modulated with a transmission chirp signal; the frequency and timing synchronization circuit comprising:

a chirp signal generator for generating a reference chirp signal having the same chirp rate with the transmission chirp signal and a conjugate complex signal of the reference chirp signal;

a first demodulator for obtaining a first in-phase complex signal and a first quadrature-phase complex signal by demodulating the received signal with the reference chirp signal and the conjugate complex signal, respectively;

a plurality of frequency offset circuits each obtaining respective one of offset signals by shifting a frequency of the received signal by a distinct offset frequency;

second demodulators each obtaining respective one of offset in-phase complex signals and respective one of offset quadrature-phase complex signals by demodulating respective one of the offset signals with the reference chirp signal and the conjugate complex signal, respectively; and a detector unit for detecting the frequency shift and the synchronization timing according to a first and a second peak frequency, the first peak frequency giving a maximum power spectrum among frequency components of the first in-phase complex signal and offset in-phase complex signals, and the second peak frequency giving a maximum power spectrum among frequency components of the first quadrature-phase complex signal and the offset quadrature-phase complex signals.

5. A frequency and timing synchronization circuit as recited in claim 4; the detector unit comprising:

a complex FFT circuit for transforming the first in-phase complex signal, the offset in-phase complex signals, the first quadrature-phase complex signal and the offset quadrature-phase complex signals into discrete frequency domain signals;

a power detector for calculating a power spectrum of each frequency component of each of the discrete frequency domain signals; and a comparator for detecting the first peak frequency which gives a maximum value among power spectrums calculated by the power detector from the discrete frequency domain signals corresponding to the first in-phase complex signal and the offset in-phase complex signals, and the second peak frequency which gives a maximum value among power spectrums calculated by the power detector from the discrete frequency domain signals corresponding to the first quadrature-phase complex signal and the offset quadrature-phase complex signals.

6. A frequency and timing synchronization circuit as recited in claim 5; wherein the distinct offset frequency of each of the frequency offset circuits is determined to be different from each other based on the resolution of the complex FFT circuit defined by a sampling frequency and a number of samples applied in the complex FFT circuit.

* * * * *

UNITED STATES PATENT AND TRADEMARK OFFICE
CERTIFICATE OF CORRECTION

PATENT NO.     : 6,498,822 B1
DATED          : December 24, 2002
INVENTOR(S)    : Hiroshi Tanaka It is certified that error appears in the above-identified patent and that said Letters Patent is hereby corrected as shown below:

Column 4,
Line 33, delete "Fp=Δf".
Line 39, delete "Fq=Δf";
Line 43, change "$Fp = \Delta f - \frac{\Delta t}{\mu T^2}$" to -- $Fq = \Delta f - \frac{\Delta t}{\mu T^2}$ --.

Column 5,
Line 13, change "a" to -- α --.

Column 7,
Line 21, change "f o" to -- fo --.

Column 8,
Line 2, change "$P_1 = \frac{1}{\sqrt{2}} \exp(j2\pi(\Delta f + \frac{\Delta t}{\mu T^2})t)$" to -- $P_1 = \frac{1}{\sqrt{2}} \exp(j2\pi(\Delta f + fo + \frac{\Delta t}{\mu T^2})t)$ --.

Line 15, change "$Fp = \Delta f + fo + \frac{\Delta t}{\mu T^2} = Fp + Fo$" to -- $Fp = \Delta f + fo + \frac{\Delta t}{\mu T^2} = Fp + fo$ --.

Line 19, change "$Fq = \Delta f + fo - \frac{\Delta t}{\mu T^2} = Fq + Fo$" to $Fq = \Delta f + fo - \frac{\Delta t}{\mu T^2} = Fq + fo$ Line 60, delete "20".

Column 9,
Line 6, change "call" to -- can --.

Signed and Sealed this

Second Day of December, 2003

JAMES E. ROGAN
*Director of the United States Patent and Trademark Office*